United States Patent
Kang et al.

(10) Patent No.: US 8,556,652 B2
(45) Date of Patent: Oct. 15, 2013

(54) FLEXIBLE PRINTED CIRCUIT BOARD ASSEMBLY AND FLAT PANEL DISPLAY APPARATUS USING THE SAME

(75) Inventors: Chang-Wook Kang, Yongin (KR); Hoe-Woo You, Yongin (KR)

(73) Assignee: Samsung Display Co., Ltd., Yongin, Gyeongg-Do (KR)

( * ) Notice: Subject to any disclaimer, the term of this patent is extended or adjusted under 35 U.S.C. 154(b) by 54 days.

(21) Appl. No.: 13/200,404

(22) Filed: Sep. 23, 2011

(65) Prior Publication Data
US 2012/0223659 A1    Sep. 6, 2012

(30) Foreign Application Priority Data
Mar. 2, 2011    (KR) .................. 10-2011-0018461

(51) Int. Cl.
*H01R 12/24*    (2006.01)
(52) U.S. Cl.
USPC .......................................... 439/498; 439/492
(58) Field of Classification Search
USPC ................... 439/77, 260, 492–499
See application file for complete search history.

(56) References Cited

U.S. PATENT DOCUMENTS

| | | | | |
|---|---|---|---|---|
| 3,325,769 A * | 6/1967 | Travis | ........................... | 439/496 |
| 4,695,108 A * | 9/1987 | Ichitsubo | ........................ | 439/59 |
| 4,915,650 A * | 4/1990 | Daly et al. | .................... | 439/498 |
| 5,007,856 A * | 4/1991 | Puerner | ........................ | 439/452 |
| 5,163,847 A * | 11/1992 | Regnier | ........................ | 439/157 |
| 5,397,247 A * | 3/1995 | Aoki et al. | .................... | 439/496 |
| 6,817,892 B2 * | 11/2004 | Sakai et al. | ................... | 439/495 |
| 7,083,455 B1 * | 8/2006 | Miura et al. | .................. | 439/260 |
| 7,166,803 B2 * | 1/2007 | Sakurai et al. | ............. | 174/117 F |
| 7,241,167 B2 * | 7/2007 | Yamada et al. | ............... | 439/498 |
| 7,887,351 B2 * | 2/2011 | Wang et al. | .................... | 439/260 |
| 2006/0264093 A1 | 11/2006 | Shim | | |

FOREIGN PATENT DOCUMENTS

| | | | |
|---|---|---|---|
| KR | 10 2004-0051521 A | 6/2004 | |
| KR | 10 2006-0120895 A | 11/2006 | |

* cited by examiner

*Primary Examiner* — Thanh Tam Le
(74) *Attorney, Agent, or Firm* — Lee & Morse, P.C.

(57) ABSTRACT

A flexible printed circuit board (FPCB) assembly including a plurality of FPCBs configured to be plugged into a single combination slot of a single connector, each of the FPCBs including a body, and a plug unit at an end portion of the body, wherein the plug units of the plurality of FPCBs are configured to be combinedly plugged together into the single combination slot.

18 Claims, 7 Drawing Sheets

FLEXIBLE PRINTED CIRCUIT BOARD ASSEMBLY AND FLAT PANEL DISPLAY APPARATUS USING THE SAME

CROSS-REFERENCE TO RELATED PATENT APPLICATION

This application claims the benefit of Korean Patent Application No. 10-2011-0018461, filed on Mar. 2, 2011, in the Korean Intellectual Property Office, the disclosure of which is incorporated herein in its entirety by reference.

BACKGROUND

1. Field

Embodiments relate to a flexible printed circuit board (FPCB) assembly used in a flat panel display apparatus, and more particularly, to an FPCB assembly having a simple connection structure with a connector, and a flat panel display apparatus using the FPCB assembly.

2. Description of the Related Art

A flat panel display apparatus, e.g., a liquid crystal display apparatus, includes a large number of component devices that operate by exchanging signals with a controller, e.g., a liquid crystal module, a touch panel, a light-emitting diode (LED) light source, and so forth.

The component devices are connected to the controller via flexible printed circuit boards (FPCBs). In general, component devices are separately connected to FPCBs, connectors corresponding to the number of FPCBs are prepared as access units to be connected to the controller, and the FPCBs are one-to-one connected to the connectors.

SUMMARY

One or more embodiments are directed to a flexible printed circuit board (FPCB) assembly.

One or more embodiments may provide a flexible printed circuit board (FPCB) assembly including a plurality of FPCBs configured to be plugged into a single combination slot of a single connector, each of the FPCBs, including a body, and a plug unit at an end portion of the body, wherein the plug units of the plurality of FPCBs are configured to be combinedly plugged together into the single combination slot.

The FPCB assembly may include three FPCBs and the plug units may be configured such that the three FPCBs are connected to the single connector.

The plug unit of at least one of the plurality of FPCBs may include an alignment protrusion for guiding insertion into the combination slot.

The plug unit of at least one of the plurality of FPCBs may include at least one groove.

The plug unit of at least one other one of the plurality of FPCBs may include at least one protrusion to be received by the at least one groove, respectively.

The plurality of FPCBs may include a first FPCB disposed at a central position, and second and third FPCBs separately disposed at two sides of the first FPCB.

The first, second and third FPCBs may be arranged in a line such that at least a portion of each of the first, second and third FPCBs extend along a same plane.

The plug unit of the first FPCB may include at least two access terminals at two portions thereof, the plug units of the second and third FPCBs being configured to be arranged on and electrically connected to the respective one of the access terminals.

The at least two access terminal may be arranged along a same surface and/or extend along a same plane of the body of the first FPCB.

The plug units of the first through third FPCBs may be combined in a line by separately bonding the plug units of the second and third FPCBs to two side surfaces of the plug unit of the first FPCB.

The plug unit of the first FPCB may include combination grooves on two side surfaces thereof, and the second and third plug units of the second and third FPCBs include combination protrusions corresponding to the combination grooves, and the plug units of the first through third FPCBs are combined in a line by combining respective ones of the combination protrusions with the combination grooves.

The plug unit of the first FPCB may include combination protrusions on two side surfaces thereof, and the second and third plug units of the second and third FPCBs include combination grooves corresponding to the combination protrusions, and the plug units of the first through third FPCBs are combined in a line by combining respective ones of the combination protrusions with the combination grooves.

One or more embodiments may provide a flat panel display apparatus, including a plurality of component devices for displaying an image, a controller for controlling the component devices, and a flexible printed circuit board (FPCB) assembly for connecting the component devices to the controller, wherein the FPCB assembly includes a plurality of FPCBs, each including a body connected to the component device, and a plug unit at an end portion of the body to be plugged into a combination slot of a connector connected to the controller, wherein the plug units of the plurality of FPCBs are combined to be plugged together into one combination slot.

BRIEF DESCRIPTION OF THE DRAWINGS

Features will become more apparent by describing in detail exemplary embodiments thereof with reference to the attached drawings in which.

DETAILED DESCRIPTION

Figure 1A:
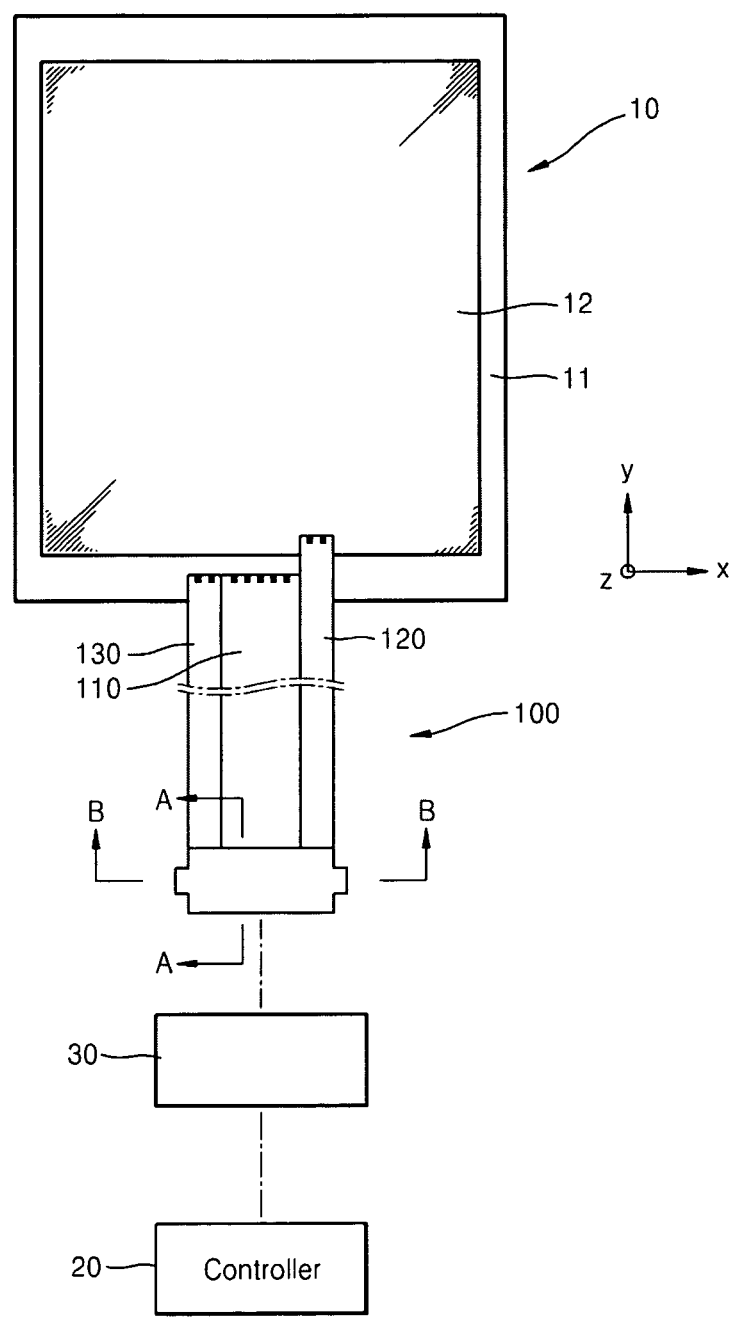
FIG. 1A illustrates a plan view of a flat panel display apparatus using a flexible printed circuit board (FPCB) assembly, according to an embodiment.
Figure 1B:
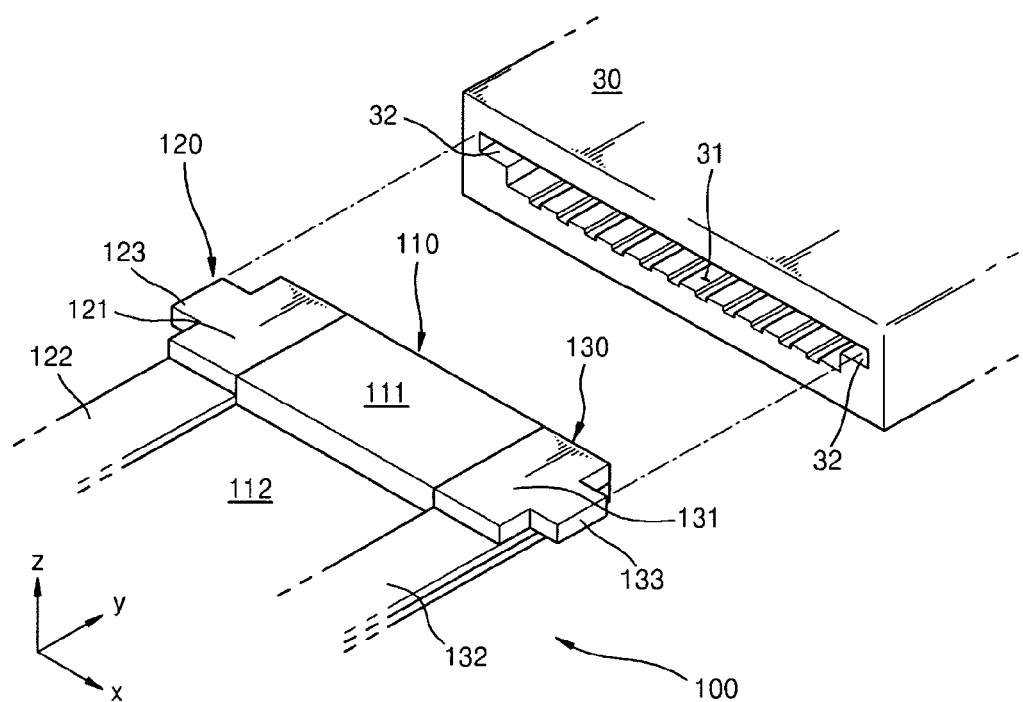
FIG. 1B illustrates an exploded perspective view of a connection structure between the FPCB assembly and a connector illustrated in FIG. 1A.

FIG. 1A illustrates a plan view of a flat panel display apparatus 10 using a flexible printed circuit board (FPCB)

assembly 100, according to an embodiment. FIG. 1B illustrates an exploded perspective view of a connection structure between the FPCB assembly and a connector illustrated in FIG. 1A.

As illustrated in FIG. 1A, the flat panel display apparatus 10 may include a substrate 11 on which a liquid crystal module (not shown) and a light-emitting diode (LED) light source (not shown) are mounted, and a touch panel 12. The touch panel 12 may be mounted on the substrate 11 for touch manipulation. Component devices such as the liquid crystal module, the LED light source (not shown), and the touch panel 12 may be connected to and controlled by a controller 20 via the FPCB assembly 100 and a connector 30.

The FPCB assembly 100 may include a plurality of FPCBs for connecting the component devices to the controller 20. For example, the FPCB assembly 100 may include a first FPCB 110 connected to the liquid crystal module (not shown), a second FPCB 120 connected to the touch panel 12, and a third FPCB 130 connected to the LED light source (not shown).

Referring to FIG. 1A, the first through third FPCBs 110, 120, and 130 are not connected to individual connectors but are connected together to one connector 30. More particularly, e.g., as illustrated in FIG. 1B, plug units 111, 121, and 131 may be formed at end portions of bodies 112, 122, and 132 of the first through third FPCBs 110, 120, and 130 may be combined and plugged together into a combination slot 31 of a single connector 30. The FPCB assembly 100 may include one or more alignment protrusions 123, 133. The alignment protrusions 123, 133 may be inserted into a corresponding guide slot 32 of the connector 30 so as to guide accurate combination between the FPCB assembly 100 and the connector 30.

An exemplary embodiment of a structure of the FPCB assembly 100 will now be described in more detail with reference to FIGS. 1A through 1E.

Figure 1C:
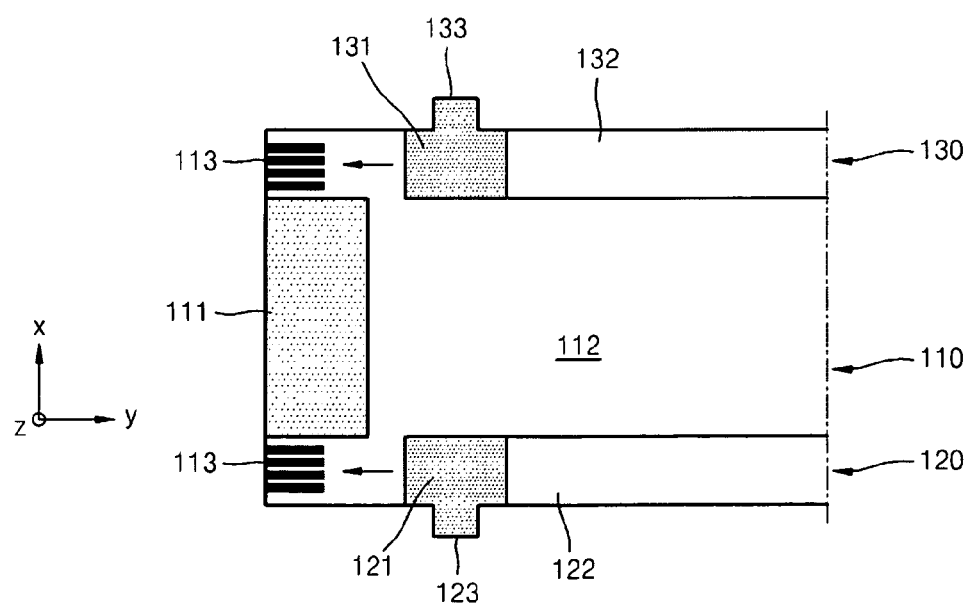
FIG. 1C illustrates an exploded plan view of the FPCB assembly illustrated in FIG. 1A.

FIG. 1C illustrates an exploded plan view of the first through third FPCBs 110, 120, and 130 of the FPCB assembly 100 illustrated in FIG. 1A.

As illustrated in FIG. 1C, in the FPCB assembly 100, the FPCB 110 may be disposed at a central position and the second and third FPCBs 120 and 130 may be respectively disposed on left and right sides of the first FPCB, and the first through third FPCBs 110, 120, and 130 may be combined into one.

In one or more embodiments, access terminals 113 to which the second and third FPCBs 120 and 130 may be connected may be formed, e.g., on a surface or plane of the body 112 of the first FPCB 110. More particularly, e.g., the access terminals 113 may be formed at left and right sides of the plug unit 111 on the respective surface of the body 112 of the first FPCB 110, and the plug units 121 and 131 of the second and third FPCBs 120 and 130 may be electrically connected on the access terminals 113, respectively. In more detail, a wiring (not shown) may be formed on the body 122 under the plug unit 121 of the second FPCB 120 and a wiring (not shown) formed on the body 132 under the plug unit 131 of the third FPCB 130, and the wirings may be separately connected to the access terminals 113, respectively. In one or more embodiments, the plug unit 111 of the first FPCB 110 and the plug units 121 and 131 of the second and third FPCBs 120 and 130 may be combined in a line. Embodiments are not, however, limited to a line, e.g., a shape of the combination may be a zig-zag. The first through third FPCBs 110, 120, and 130 may be combined by using, e.g., a bonding method using adhesive tape.

Figure 1D:
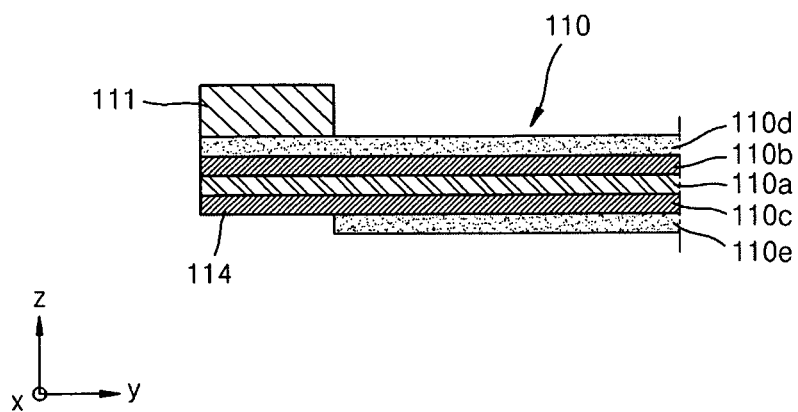
FIG. 1D illustrates a cross-sectional view cut along a line A-A of FIG. 1A.
Figure 1E:
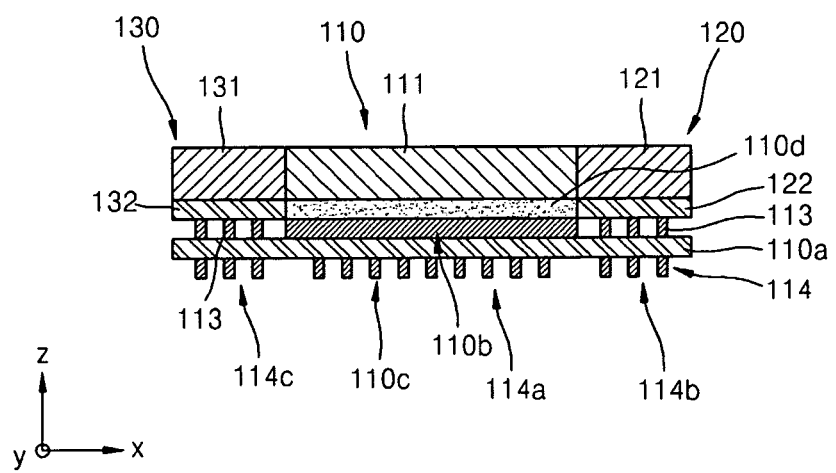
FIG. 1E illustrates a cross-sectional view cut along a line B-B of FIG. 1A.

An exemplary cross-sectional structure of the FPCB assembly 100 will now be described with reference to FIGS. 1D and 1E. FIG. 1D illustrates a cross-sectional view cut along a line A-A of FIG. 1A. FIG. 1E illustrates a cross-sectional view cut along a line B-B of FIG. 1A. Referring to FIG. 1D, the first FPCB 110 may include a base film 110a, upper and lower conductive layers 110b and 110c respectively formed on and under the base film 110a, and upper and lower coating layers 110d and 110e. The upper and lower coating layers 110d, 110e may be respectively formed as uppermost and lowermost layers. The upper and lower conductive layers 110b and 110c may include copper or a copper-plated material, and may form the access terminals 113 to be connected to the second and third FPCBs 120 and 130, and other access terminals 114 to access the connector 30. That is, portions of the upper conductive layer 110b may form the access terminals 113, which may be electrically connected to the second and third FPCBs 120 and 130, and portions of the lower conductive layer 110c may form the access terminals 114, which may be electrically connected to the connector 30.

Referring to FIG. 1E, when the first, second, and third FPCBs 110, 120, 130 are combined, the second and third FPCBs 120 and 130 may be electrically connected to the access terminals 113 formed by the upper conductive layer 110b of the first FPCB 110. More particularly, the second and third FPCBs 120, 130 may be arranged on a portion of upper conductive layer 110b formed on the first FPCB 110. In such embodiments, bodies 122, 132 of the second and third FPCBs 120, 130 may not extend along a same x-y plane, i.e., may extend above or below the body 112 of the first FCPG 110 relative to a z-axis. In such embodiments, the first, second, and third plug units 111, 121, 131 may extend along a same x-y plane. More particularly, one or more surfaces of, e.g., the plug units 111, 121, 131 may be adjacent to and/or aligned with each other. The access terminals 114 formed by the lower conductive layer 110c may be electrically connected to access terminals (not shown) in the connector 30 when the combined FPCB assembly 100 is inserted into the combination slot 31 of the connector 30.

More particularly, e.g., in one or more embodiments, the access terminals 114 of the lower conductive layer 110c may be wired in such a way that a region 114a under the first FPCB 110 may be electrically connected to the first FPCB 110, a region 114b under the second FPCB 120 may be electrically connected to the access terminal 113 for accessing the second FPCB 120, and a region 114c under the third FPCB 130 may be electrically connected to the access terminal 113 for accessing the third FPCB 130. In such embodiments, although the plug units 111, 121, and 131 of the first through third FPCBs 110, 120, and 130 may be combined as a single plug unit, which may be received by a single connector, e.g., 30, the first through third FPCBs 110, 120, and 130 may independently transmit signals between the controller 20 and the component devices.

Therefore, if the plug units 111, 121, and 131 of the first through third FPCBs 110, 120, and 130 connected to a plurality of component devices are combined into one plug unit and are plugged together to a single connector 30 as described above, a plurality of connectors are not needed to connect a controller to the component devices. One or more embodiments of a FPCB assembly employing one or more features described herein, e.g., FPCB 100, one or more of a number of connectors, cost, size, and/or weight may be reduced. One or more embodiments may be employed in a flat panel display apparatus.

In one or more embodiments, while the plug units 111, 121, and 131 may be combined with each other so as to be plugged together into the single connector 30, the bodies 112, 122, and 132 may not be always integrally combined with each other.

Figure 1F:
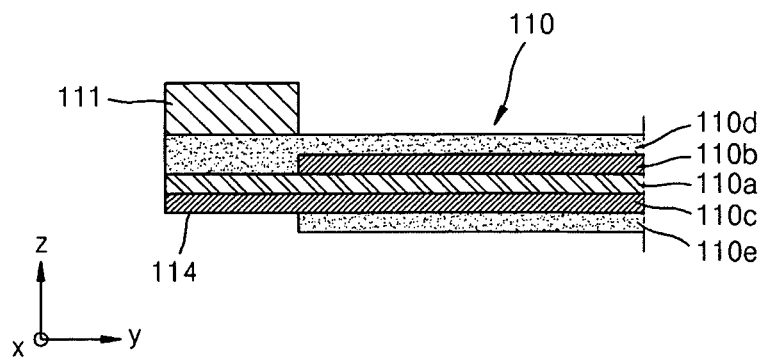
FIGS. 1F and 1G illustrate cross-sectional views of other exemplary embodiments of the FPCB assembly along line A-A of FIG. 1A.
Figure 1G:
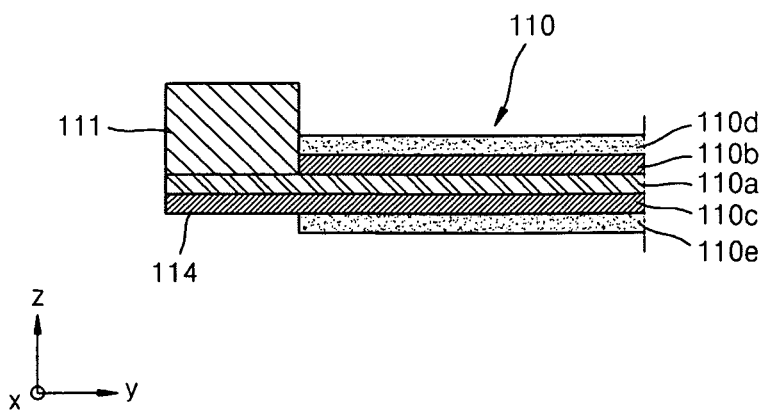

FIGS. 1F and 1G illustrate cross-sectional views of other exemplary embodiments of the FPCB assembly 110 along line A-A of FIG. 1A. In one or more embodiments, the upper and lower coating layers 110d and 110e may include, e.g., an insulator such as polyimide. The upper coating layer 110d may cover edges of the upper conductive layer 110b, as illustrated in FIG. 1F.

Alternatively, as shown in FIG. 1G, e.g., the plug unit 111 may contact the base film 110a and may cover edges of the upper conductive layer 110b.

As described above, in one or more embodiments, a plurality of plug units, e.g., the plug units 111, 121, and 131, of a plurality of FPCBs, e.g., the first through third FPCBs 110, 120, and 130, are combined into one single plug unit to be received by a single connector, e.g., the connector 30, the cross-sectional structure of an FPCB assembly, e.g., the FPCB assembly 100, may be variously modified as illustrated, e.g., in FIG. 1F or 1G, and the modification of the cross-sectional structure is included in the scope of the embodiments.

Figure 2:
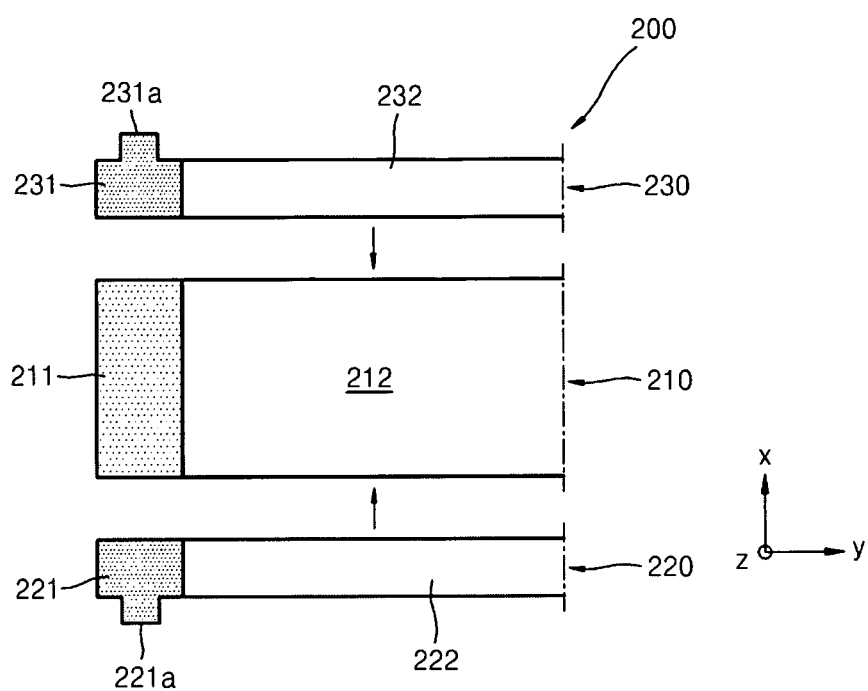
FIG. 2 illustrates an exploded plan view of an FPCB assembly according to another embodiment.

FIG. 2 illustrates an exploded plan view of an FPCB assembly 200 according to another embodiment. In general, only differences between the exemplary FPCB 200 of FIG. 2 and the FPCB 100 of FIGS. 1-G will be described below.

Like the previous embodiment of FIGS. 1A through 1G, the FPCB assembly 200 may include a plurality of FPCBs such as first through third FPCBs 210, 220, and 230, and may have a structure in which the first through third FPCBs 210, 220, and 230 are combined into one and are plugged together into the connector 30. The first, second, and third FPCBs 210, 220, 230 may each include a body 212, 222, 232, respectively. Each of the bodies 212, 222, 232 may be respectively connected to a plug unit 211, 221, 231.

However, in the FPCB assembly 200, the second and third FPCBs 220, 230 may be at least partially disposed along a same x-y plane as the body 212 of the first FPCB 210. More particularly, e.g., in the FPCB assembly 200, the second and third FPCBs 220 and 230 may be bonded to sides of the first FPCB 210. For example, the bodies 222, 232 of the second and third FPCBs 220, 230 may be arranged so as to be adjacent and/or connected to two sides of the body 212. In such embodiments, the bodies 222, 232 of the second and third FPCBs 220, 230 may be substantially and/or completely aligned with each other and/or the body 212 of the first FPCB 210 along an x-y plane.

More particularly, in such embodiments, the bodies 222 and 232 of the second and third FPCBs 220 and 230 may respectively closely contact left and right side surfaces of the body 212 of the first FPCB 210, and plug units 221 and 231 of the second and third FPCBs 220 and 230 respectively closely contact left and right side surfaces of the plug unit 211 of the first FPCB 210. In such embodiments, access terminals to be connected to terminals of the connector 30 may be individually formed under the first through third FPCBs 210, 220, and 230. The first through third FPCBs 210, 220, and 230 may be combined by using, e.g., a bonding method using adhesive tape. In one or more embodiments, although the plug units 211, 221, and 231 may be combined with each other to be plugged together into a single connector 30, the bodies 212, 222, and 232 may not be always integrally combined with each other. Reference numerals 221a and 231a represent alignment protrusions to be inserted into the guide slot 32 of the connector 30 illustrated in FIG. 1B.

One or more embodiments of the FPCB assembly 200 may provide a structure in which the plug units 211, 221, and 231 of the first through third FPCBs 210, 220, and 230 are combined into one and are plugged together into the single connector 30. One or more embodiments of an FPCB assembly employing one or more features described herein, e.g., FPCB 100, 200 may enable a reduced number of connectors, e.g., 30, to be reduced and may further enable smaller and/or lighter products to be produced at relatively lower cost.

Figure 3A:
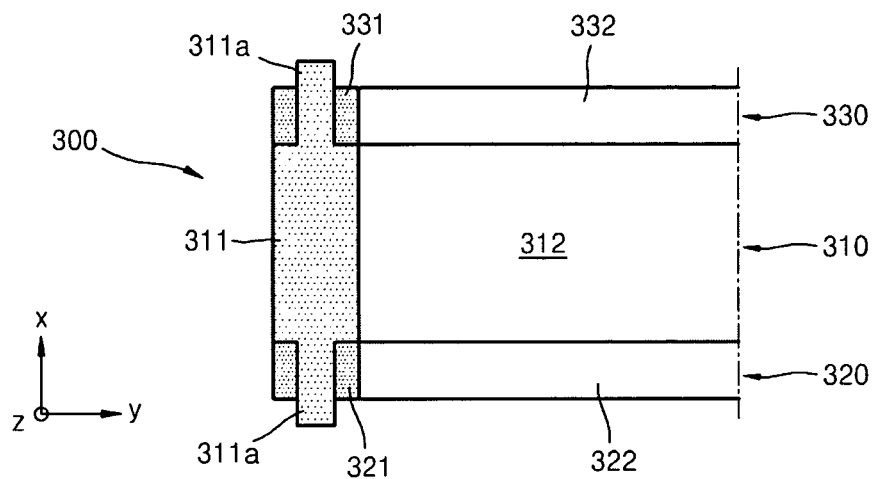
FIG. 3A illustrates a plan view of an FPCB assembly according to another embodiment.
Figure 3B:
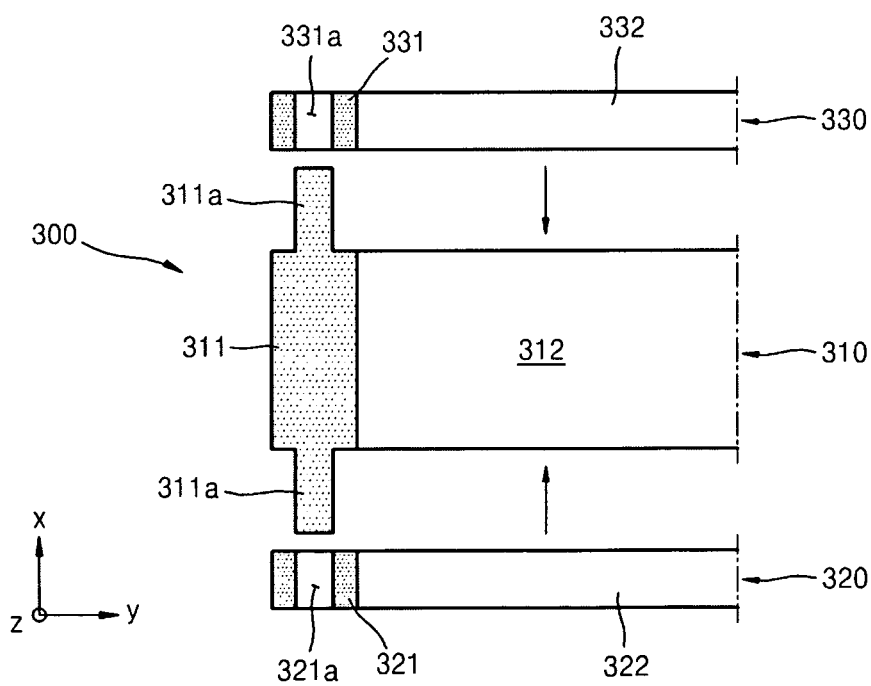
FIG. 3B illustrates an exploded plan view of the FPCB assembly illustrated in FIG. 3A.

FIG. 3A illustrates a plan view of an FPCB assembly 300 according to another embodiment. FIG. 3B illustrates an exploded plan view of the FPCB assembly 300 illustrated in FIG. 3A. In general, only differences between the FPCB 300 of FIG. 3 and the FPCB 200 of FIG. 2 will be described below.

Referring to FIG. 3, the FPCB assembly 300 may include first, second and third FPCBs 310, 320, and 330, and plug units 311, 321, 331. Each of the first, second and third FPCBs 310, 320, and 330 may include bodies 312, 322, 332, respectively. The second and third FPCB's 320, 330 may closely contact left and right side surfaces of the first FPCB 310. More particularly, e.g., the bodies 322 and 332 of the second and third FPCBs 320 and 330 may be adjacent to and/or may be connected to left and right side surfaces of the body 312 of the first FPCB 310, respectively. The plug unit 311 of the first FPCB 310 may be arranged at a central position. The plug units 321 and 331 of the second and third FPCBs 320 and 330 may be adjacent to and/or may be connected to left and right side surfaces of the plug unit 311 of the first FPCB 310. While the plug units 311, 321, and 331 may be combined with each other to be plugged together into the single connector 30, the bodies 312, 322, and 332 may not be always integrally combined with each other.

More particularly, in the FPCB 300, as illustrated in FIG. 3B, one or more combination protrusions 311a may be formed on the plug unit 311 of the first FPCB 310. Combination grooves 321a and 331a may be formed in the plug units 321 and 331 of the second and third FPCBs 320 and 330, respectively. The combination protrusions 311a, and the combination grooves 321a, 331a may connect together to combine the plug units 311, 321, and 331. In one or more embodiments, the plug units 311, 321, and 331 may be combined in a line by combining the combination protrusions 311a with the combination grooves 321a and 331a. In such embodiments, the plug units 311, 321, 331 may be combined without any additional material, e.g., adhesive tape. The combination protrusions 311a may also function as alignment protrusions to be inserted into the guide slot 32 of the connector 30 illustrated in FIG. 1B.

One or more embodiments of the FPCB assembly 300 according to the current embodiment may provide a structure in which the plug units 311, 321, and 331 of the first through third FPCBs 310, 320, and 330 may be combined into one and are plugged together into the single connector 30. One or more embodiments may provide an FPCB assembly, e.g., 300, that may be employed with a reduced number of connectors, e.g., 30, and thus, smaller and lighter products may be produced at low costs.

Figure 4A:
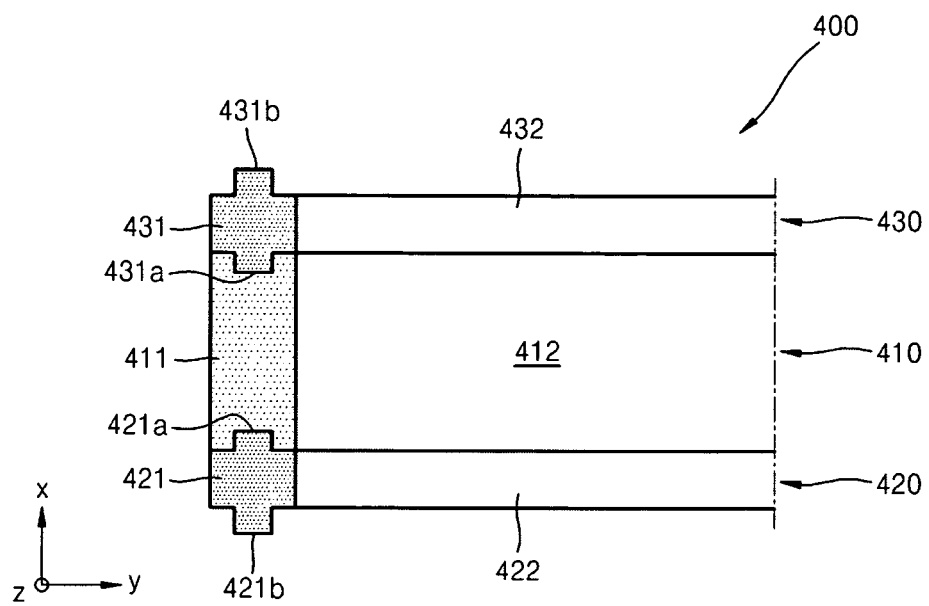
FIG. 4A illustrates a plan view of an FPCB assembly according to another embodiment.
Figure 4B:
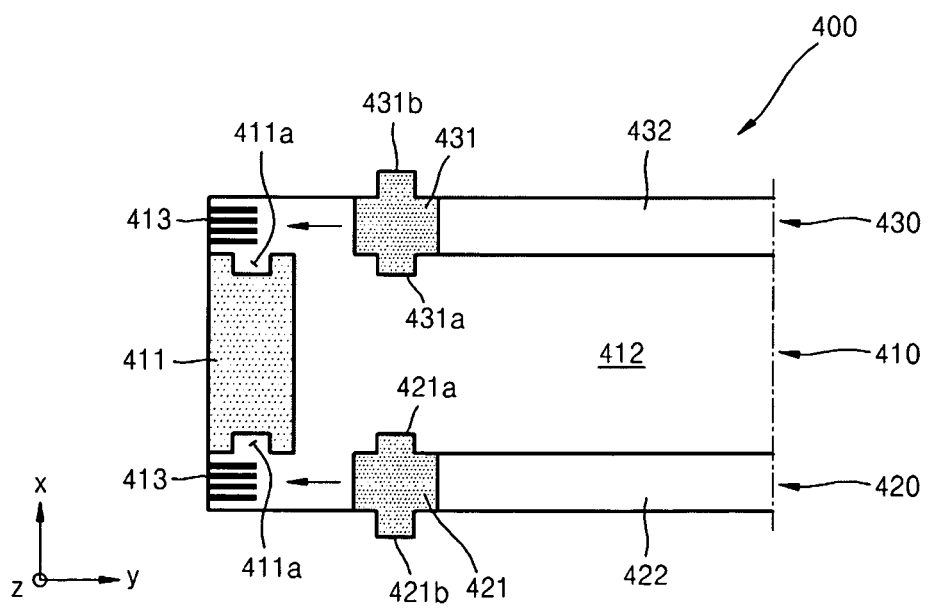
FIG. 4B illustrates an exploded plan view of the FPCB assembly illustrated in FIG. 4A.

FIG. 4A illustrates a plan view of an FPCB assembly 400 according to another embodiment. FIG. 4B illustrates an exploded plan view of the FPCB assembly 400 illustrated in FIG. 4A. In general, only differences between thee FPCB assembly 400 and the FPCB assembly described in connection with FIG. 1C will be described below.

The FPCB assembly 400 may include first, second, and third FPCBs 410, 420, 430, and first, second, and third plug units 411, 421, 431. Each of the first, second and third FPCBs 410, 420, and 430 may include bodies 412, 422, 432, respectively. Access terminals 413 may be formed at left and right sides of the plug unit 411 on a plane of the body 412 of the first FPCB 410. The plug units 421 and 431 of second and third FPCBs 420 and 430 may be connected on the access terminals 413. Wiring (not shown) may be formed on the body 422 under the plug unit 421 of the second FPCB 420 and wiring (not shown) may be formed on the body 432 under the plug unit 431 of the third FPCB 430, and such wiring may be separately connected to the access terminals 413. In one or more embodiments, the plug unit 411 of the first FPCB 410 and the plug units 421 and 431 of the second and third FPCBs 420 and 430 may be combined in a line. In such embodiments, bodies 422, 432 of the second and third FPCBs 420, 430 may not extend along a same x-y plane, i.e., may extend above or below the body 412 of the first FCPG 410 relative to a z-axis. In such embodiments, the first, second, and third plug units 411, 421, 431 may extend along a same x-y plane. More particularly, one or more surfaces of, e.g., the plug units 411, 421, 431 may be adjacent to and/or aligned with each other.

More particularly, referring to FIGS. 4A and 4B, the plug unit 411 may include combination grooves 411a and the plug units 421, 431 may include combination protrusions 421a, 431a. In such embodiments, the first through third FPCBs 410, 420, and 430 may be combined by combining the combination grooves 411a of the plug unit 411 of the first FPCB 410 with the combination protrusions 421a and 431a of the plug units 421 and 431 of the and the second and third FPCBs 420 and 430.

In such embodiments, since the plug units 411, 421, and 431 may be combined in a line by combining the combination grooves 411a with the combination protrusions 421a and 431a, a combination process may be easily performed without additionally using, for example, adhesive tape. In one or more embodiments, alignment protrusions 421b and 431b may be inserted into the guide slot 32 of the connector 30 illustrated in FIG. 1B.

Although the plug units 411, 421, and 431 may be combined with each other to be plugged together into a single connector 30, the bodies 412, 422, and 432 may not be always integrally combined with each other.

One or more embodiments of the FPCB assembly 400 may provide a structure in which the plug units 411, 421, and 431 of the first through third FPCBs 410, 420, and 430 may be combined into one and are plugged together into a single connector 30. One or more embodiments may provide an FPCB assembly, e.g., 400, that may be employed with a reduced number of connectors, e.g., 30, and thus, smaller and lighter products may be produced at low costs.

It is understood that embodiments are not limited to the exemplary embodiments described above. For example, in foregoing description while protrusions and/or grooves may be described with regard to a particular plug unit, an arrangement of such protrusions and/or grooves on the plug units may, e.g., be reversed.

One or more embodiments may provide a flexible printed circuit board (FPCB) assembly capable of simplifying a connection structure between an FPCB and a connector, and a flat panel display apparatus using the FPCB assembly. Further, since a plurality of FPCBs may be connected to one connector, the number of connectors may be reduced. Thus, small and light products may be produced at low cost. Such embodiments are in contrast to the typical one-to-one connection structure that requires connectors corresponding to the number of FPCBs, such that small and light products may not be produced at a low cost.

While features have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flexible printed circuit board (FPCB) assembly including a plurality of FPCBs configured to be plugged into a single combination slot of a single connector, each of the FPCBs comprising:
   a body; and
   a plug unit at an end portion of the body,
   wherein the plug units of the plurality of FPCBs are configured to be combinedly plugged together into the single combination slot, the plurality of plug units being electrically independent of each other in the combination slot; and
   wherein the plug unit of at least one of the plurality of FPCBs includes an alignment protrusion for guiding insertion into the single combination slot.

2. The FPCB assembly of claim 1, wherein the FPCB assembly includes three FPCBs aligned along a horizontal direction and in contact with each other, the horizontal direction extending along a bottom of the combination slot, and the plug units are configured such that the three FPCBs are connected to the single connector.

3. The FPCB assembly of claim 1, wherein the plug unit of another one of the plurality of FPCBs includes at least one groove.

4. The FPCB assembly of claim 3, wherein the plug unit of the at least one of the plurality of FPCBs includes at least one protrusion to be received by the at least one groove, respectively.

5. The FPCB assembly of claim 1, wherein the plurality of FPCBs include a first FPCB disposed at a central position, and second and third FPCBs separately disposed at two sides of the first FPCB, each of the first through third FPCBs being electrically connected to a different portion of the combination slot, and the different portions of the combination slot being electrically independent of each other.

6. The FPCB assembly of claim 5, wherein the plug units of the first, second and third FPCBs are arranged in a line such that at least a portion of each of the first, second and third FPCBs extend along a same plane.

7. The FPCB assembly as claimed in claim 6, wherein the plug unit of the first FPCB includes at least two access terminals at two portions thereof, the plug units of the second and third FPCBs being configured to be arranged on and electrically connected to the respective one of the access terminals.

8. The FPCB assembly as claimed in claim 7, wherein the at least two access terminal are arranged along a same surface of the body of the first FPCB.

9. The FPCB assembly of claim 6, wherein the plug units of the first through third FPCBs are combined in a line by separately bonding the plug units of the second and third FPCBs to two side surfaces of the plug unit of the first FPCB.

10. The FPCB assembly of claim 6, wherein the plug unit of the first FPCB includes combination grooves on two side surfaces thereof, and the second and third plug units of the second and third FPCBs include combination protrusions corresponding to the combination grooves, and the plug units of the first through third FPCBs are combined in a line by combining respective ones of the combination protrusions with the combination grooves.

11. The FPCB assembly of claim 6, wherein the plug unit of the first FPCB includes combination protrusions on two side surfaces thereof, and the second and third plug units of the second and third FPCBs include combination grooves corresponding to the combination protrusions, and the plug units of the first through third FPCBs are combined in a line by combining respective ones of the combination protrusions with the combination grooves.

12. A flat panel display apparatus, comprising:
a plurality of component devices for displaying an image;
a controller for controlling the component devices; and
a flexible printed circuit board (FPCB) assembly for connecting the component devices to the controller,
wherein the FPCB assembly includes a plurality of FPCBs each including:
a body connected to the component device; and
a plug unit at an end portion of the body to be plugged into a single combination slot of a single connector connected to the controller,
wherein the plug units of the plurality of FPCBs are combined to be plugged together into the single combination slot, the plurality of plug units being electrically independent of each other in the combination slot; and
wherein the plug unit of at least one of the plurality of FPCBs includes an alignment protrusion for guiding insertion into the single combination slot.

13. The flat panel display apparatus of claim 12, wherein the plug units are combined in such a way that three FPCBs are connected to the single connector.

14. The flat panel display apparatus of claim 12, wherein the plurality of FPCBs include a first FPCB disposed at a central position, and second and third FPCBs separately disposed at two sides of the first FPCB.

15. The flat panel display apparatus of claim 14, wherein the plug unit of the first FPCB includes at least two access terminals at two portions thereof, the plug units of the second and third FPCBs being configured to be arranged on and electrically connected to the respective one of the access terminals.

16. The flat panel display apparatus of claim 14, wherein the plug units of the first through third FPCBs are combined in a line by separately bonding the plug units of the second and third FPCBs to two side surfaces of the plug unit of the first FPCB.

17. The flat panel display apparatus of claim 14, wherein the plug unit of the first FPCB includes combination grooves on two side surfaces thereof, and the second and third plug units of the second and third FPCBs include combination protrusions corresponding to the combination grooves, and the plug units of the first through third FPCBs are combined in a line by combining respective ones of the combination protrusions with the combination grooves.

18. The flat panel display apparatus of claim 14, wherein the plug unit of the first FPCB includes combination protrusions on two side surfaces thereof, and the second and third plug units of the second and third FPCBs include combination grooves corresponding to the combination protrusions, and the plug units of the first through third FPCBs are combined in a line by combining respective ones of the combination protrusions with the combination grooves.

* * * * *